(12) United States Patent
Pfaff

(10) Patent No.: US 8,491,035 B1
(45) Date of Patent: Jul. 23, 2013

(54) AERODYNAMIC DRAG REDUCTION APPARATUS FOR A TRAILER

(76) Inventor: Raimund Pfaff, Carter Lake, IA (US)

( * ) Notice: Subject to any disclaimer, the term of this patent is extended or adjusted under 35 U.S.C. 154(b) by 0 days.

(21) Appl. No.: 13/595,431

(22) Filed: Aug. 27, 2012

(51) Int. Cl.
*B62D 35/02* (2006.01)
(52) U.S. Cl.
USPC .................................. 296/180.4; 296/180.1
(58) Field of Classification Search
USPC ........................................... 296/180.1, 180.4
See application file for complete search history.

(56) References Cited

U.S. PATENT DOCUMENTS

| 2010/0187856 | A1* | 7/2010 | Boivin et al. | 296/180.4 |
| 2011/0285167 | A1* | 11/2011 | Butler | 296/180.1 |

\* cited by examiner

*Primary Examiner* — Joseph Pape
(74) *Attorney, Agent, or Firm* — Dennis L. Thomte; Thomte Patent Law Office LLC

(57) ABSTRACT

An aerodynamic drag reducer in the form of an air deflector fairing is provided for a trailer which is secured to the lower ends of each of the lower side rails of the trailer. Each of the fairings have upper outer ends which are secured to the respective lower side rail and which extends downwardly and inwardly therefrom, then upwardly and inwardly therefrom and then inwardly therefrom. The inner ends of the fairings are secured to the cross-members of the trailer. The drag reducers of this invention reduce the turbulence experienced by cross-winds subjected to the trailer thereby reducing the aerodynamic drag of the cross-winds.

7 Claims, 5 Drawing Sheets

US 8,491,035 B1

AERODYNAMIC DRAG REDUCTION APPARATUS FOR A TRAILER

BACKGROUND OF THE INVENTION

1. Field of the Invention

This invention relates to an aerodynamic drag reduction apparatus for a trailer and more particularly to aerodynamic drag reducer which is secured to the lower end of each of the lower side rails of the trailer.

2. Description of the Related Art

A vast majority of tractor truck trailers have right and left lower side rails which extend longitudinally along the lower sides of the trailer to which the lower ends of the side walls of the trailer are attached.

As the trailer is being pulled by the tractor, the trailer is often subjected to cross-winds. As the air flow from the cross-wind passes beneath the lower end of the lower side rail on the windward side of the trailer, the air flow becomes turbulent which creates an aerodynamic drag on the trailer which adversely affects the fuel mileage of the tractor.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An aerodynamic drag reduction apparatus is provided for a trailer having right and left lower side rails with each of the side rails having a forward end, a rearward end, an upper end, a lower end, an outer side and an inner side. A first elongated air deflector fairing, having a forward and a rearward end, is secured to the right lower side rail adjacent the lower end thereof which extends downwardly and inwardly therefrom and thence upwardly and inwardly beneath the trailer. A second elongated air deflector fairing, having a forward end and a rearward end, is secured to the left lower side rail adjacent the lower end thereof which extends downwardly and inwardly therefrom and thence inwardly and upwardly beneath the trailer. Each of the first and second air deflector fairings extend for a portion of the lengths of the right and left lower side rails respectively.

In the preferred embodiment, each of the forward ends of the first and second air deflector fairings is tapered.

In the preferred embodiment, each of the first and second air deflector fairings has outer and inner ends with the outer end of the first air deflector fairing being secured to the inner side of the right lower side rail at the lower end thereof and wherein the outer end of the second air deflector fairing is secured to the inner side of the left lower side rail at the lower end thereof. In the preferred embodiment, each of the first and second air deflector fairings has an outer end portion which extends downwardly from the respective lower side rail and thence inwardly and thence upwardly and inwardly beneath the floor of the trailer. Each of the air deflector fairings includes an inner end portion.

It is therefore a principal object of the invention to provide an aerodynamic drag reduction apparatus for a trailer.

A further object of the invention is to provide an aerodynamic drag reduction apparatus for a trailer which comprises first and second air deflector fairings secured to the lower ends of the right and left lower side rails of the trailer respectively.

A further object of the invention is to provide an aerodynamic drag reduction apparatus for a trailer wherein the air flow from a cross-wind is prevented from becoming turbulent by means of air deflector fairings secured to the lower end of the lower side rails of the trailer.

A further object of the invention is to provide an aerodynamic drag reduction apparatus for a trailer which may be retro-fitted onto existing trailers.

These and other objects will be apparent to those skilled in the art.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
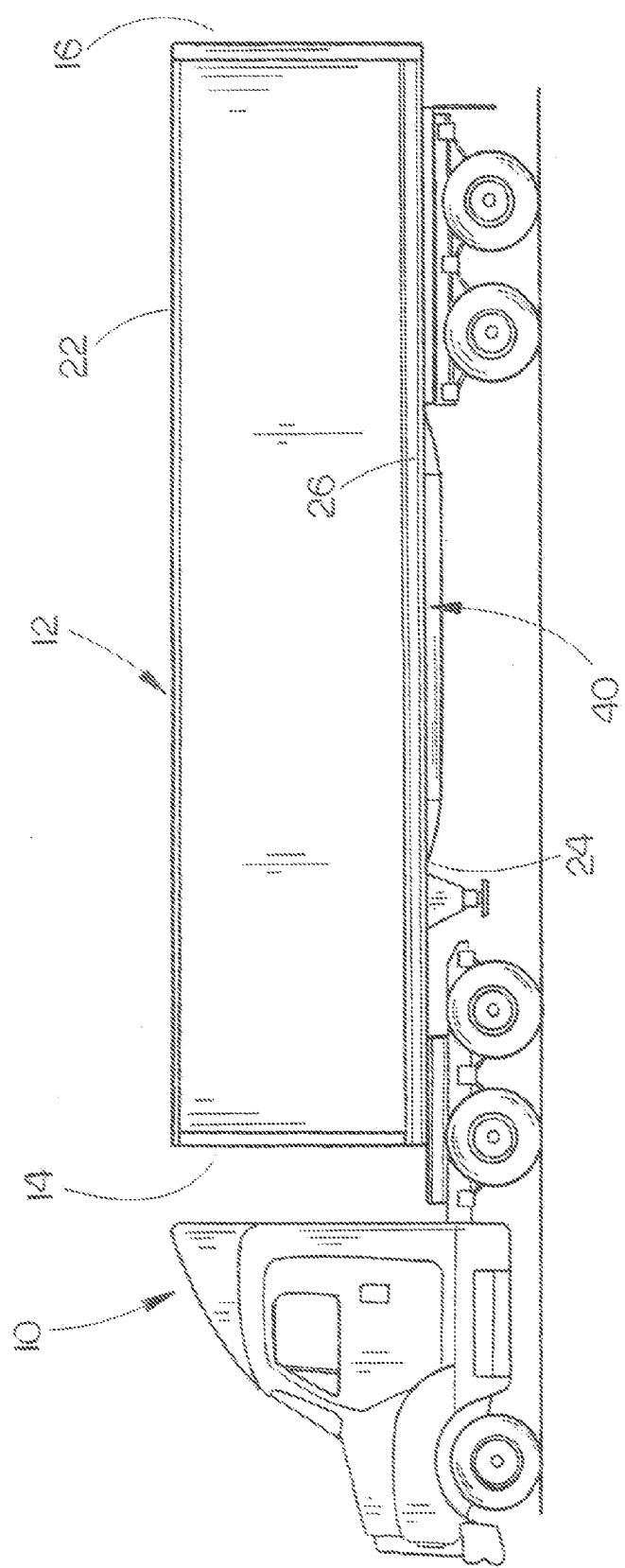
FIG. 1 is a side view of a tractor and trailer having the drag reduction apparatus of this invention mounted thereon.
Figure 2:
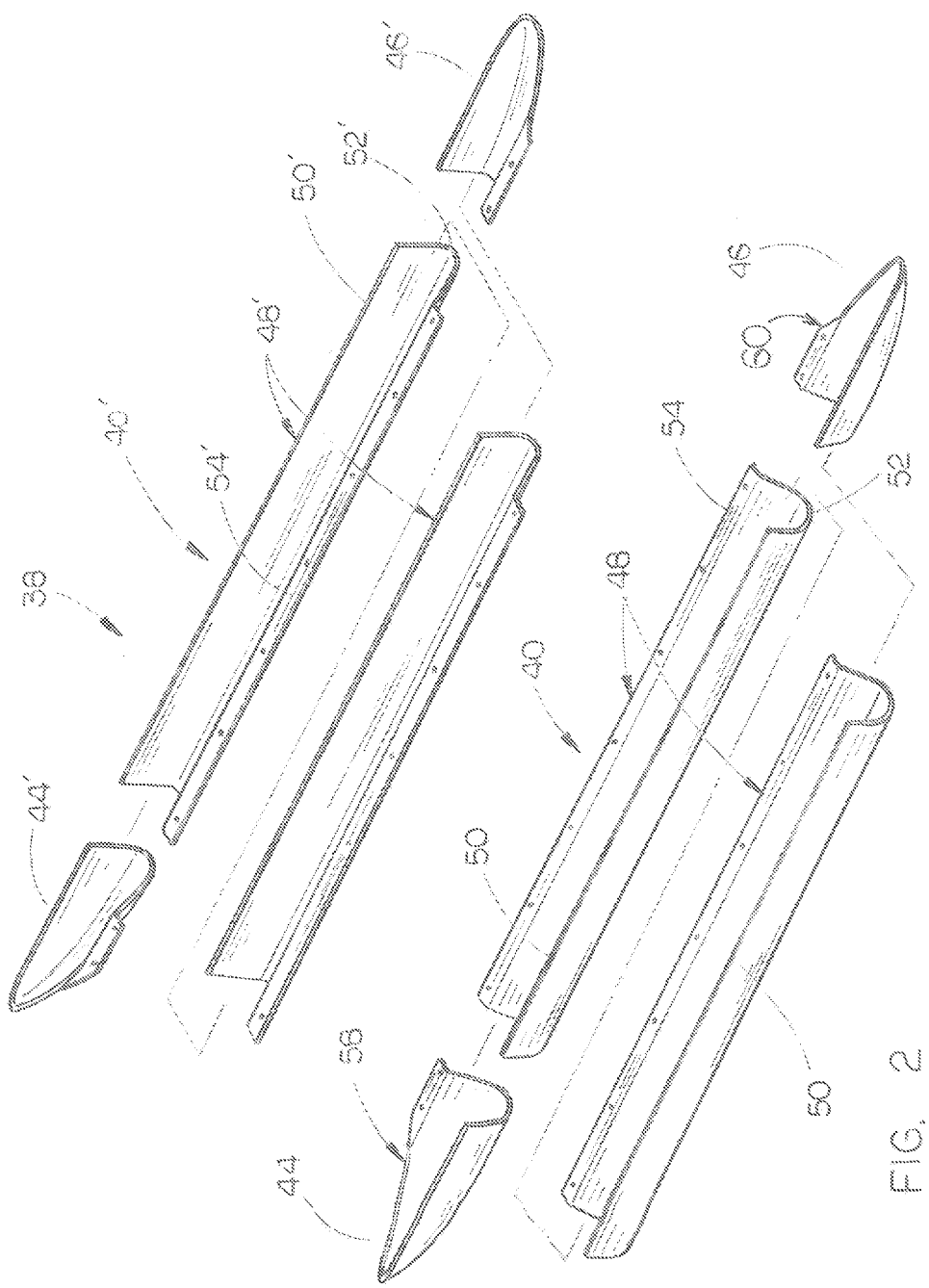
FIG. 2 is an exploded perspective view of the drag reduction apparatus of this invention.
Figure 3:
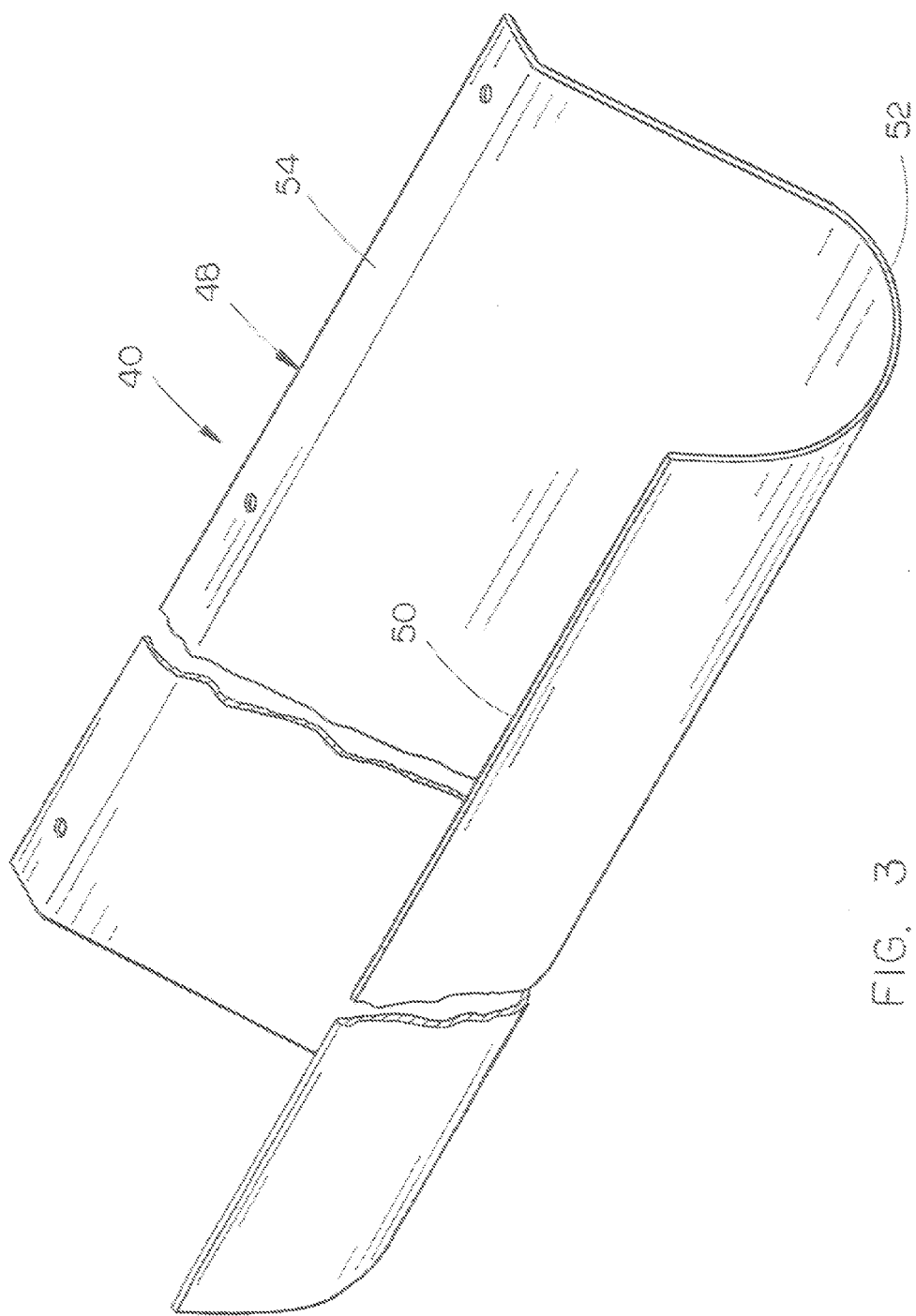
FIG. 3 is a partial perspective view of the drag reduction device of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional tractor or truck which has a trailer 12 attached to the fifth wheel thereof. Trailer 12 has a forward end 14, a rearward end 16, a left side 18, a right side 20, and upper end 22 and a lower end 24. Trailer 12 includes a longitudinally extending right lower side rail 26 to which the lower end of the right side wall of the trailer is attached in conventional fashion. Trailer 12 also includes a longitudinally extending left lower side rail 28 to which the lower end of the left side wall of the trailer is attached in conventional fashion.

Most of the lower side rails 26 and 28 being presently utilized on trailers have outwardly protruding lips 30 and 32 respectively at the lower ends thereof with the lips 30 and 32 having inner and outer surfaces. Most of the trailers on the market have a plurality of spaced-apart transversely extending cross-members 34 which are secured to the lower side rails 26 and 28 and which extend therebetween. A floor 36 is supported upon the cross-members 34 in conventional fashion.

When the trailer 12 is subjected to cross-winds, the air flow thereof impinges upon the windward lower side rail and passes therebelow towards the leeward side of the trailer 12. As the air passes beneath the windward lower side rail, the air flow becomes turbulent and creates an aerodynamic drag on the trailer thereby adversely affecting the fuel mileage of the tractor 101t is for that reason that the instant invention is provided.

The numeral 38 refers to the drag reduction apparatus of this invention which includes a left drag reducer in the form of an air deflector fairing 40 and a right drag reducer in the form of an air deflector fairing 40'. Drag fairing 40 is secured to the lower left side rail 26 while fairing 40' is secured to the right lower side rail 28. The fairings 40 and 40' extend for a portion of the lengths of the lower side rails 26 and 28 respectively.

Fairing 40 will be described as having a forward end 44 and a rearward end 46. Fairing 40 includes one or more main sections 48 depending on the length of the fairing. Each of the fairing sections 48 includes an outer upper end 50 which is secured to the inner surface of lip 30 by any convenient means. If the lower side rail 26 does not include the lip 30, the upper end 50 of fairing 40 will be secured to the lower end of the lower side rail 26 by any convenient means.

Figure 4:
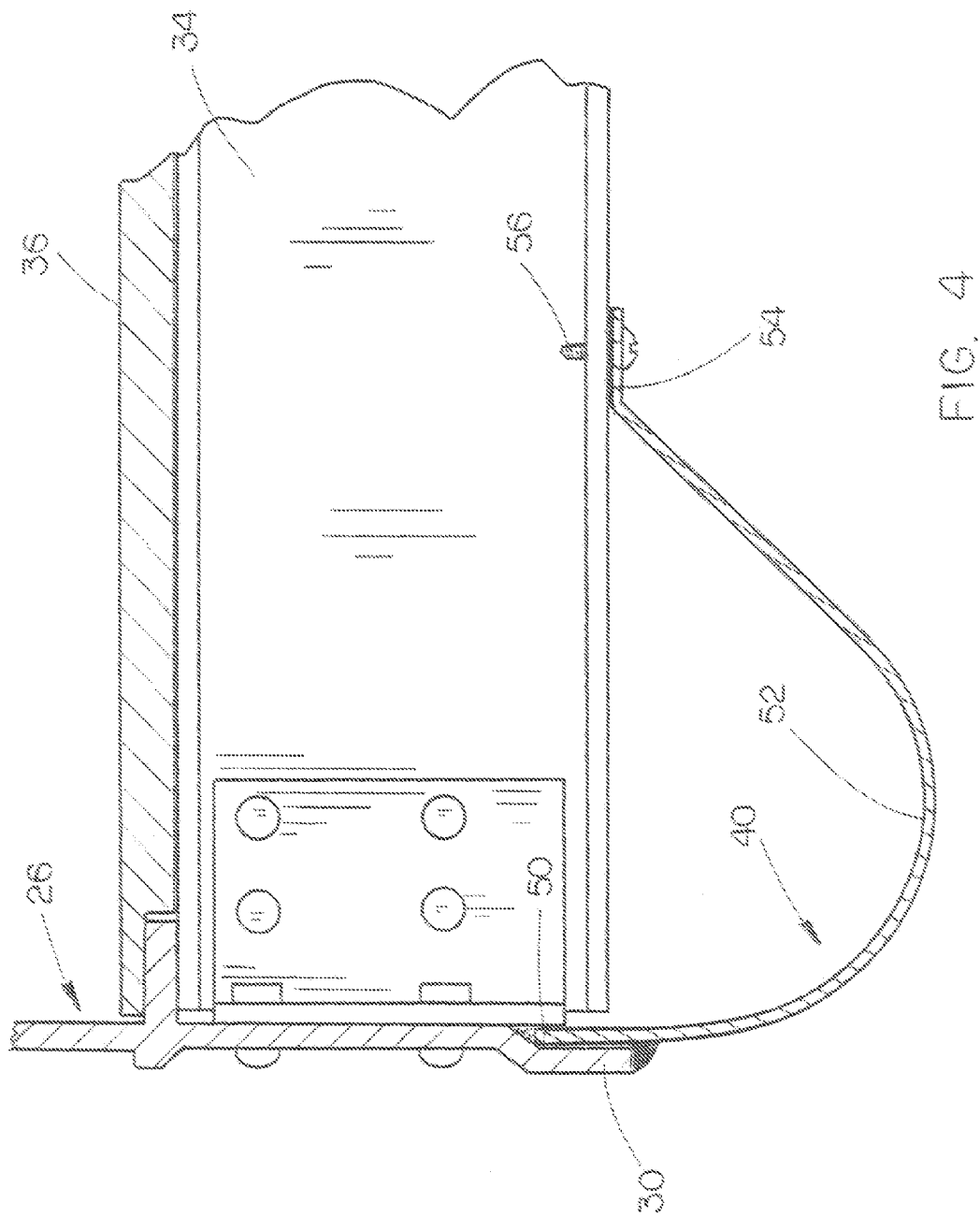
FIG. 4 is a partial sectional view of the trailer illustrating the drag reduction apparatus of this invention secured thereto.
Figure 5:
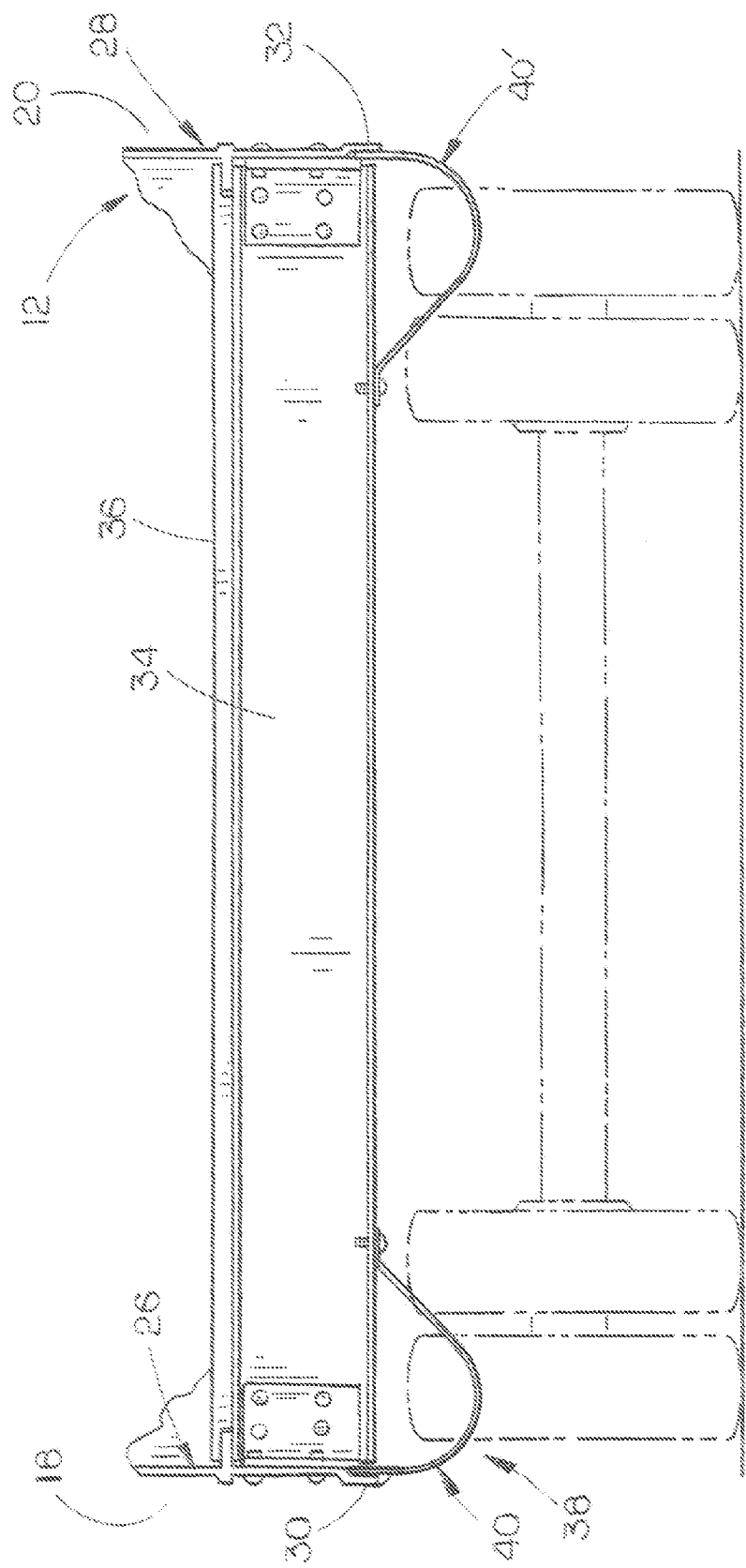
FIG. 5 is a partial rear view of the trailer illustrating the drag reduction apparatus of this invention mounted on the trailer.

As seen in FIG. 4, fairing 40 extends downwardly and inwardly from upper end 50 to a lower end portion 52, thence upwardly and inwardly therefrom to upper end 54 thereof which is horizontally disposed. The upper inner end 54 of fairing 40 is secured to the cross-members 34 by screws 56 or other suitable means.

Preferably, a tapered forward end cone or nose portion 58 is provided which is secured to and which closes the fora card end of the fairing 40. Preferably, a tapered rearward end cone 60 is secured to and which encloses the rearward end of the fairing 40.

Fairing 40' is the mirror image of the fairing 40 and will not be described in detail but with "'" being used to illustrate the identical structure on fairing 40'.

When the trailer 12 is subjected to a cross-wind, the air flow impinging upon the respective lower side rail thereof will be directed downwardly and inwardly therefrom. The air flow impinging upon the outer end of the respective fairing will be smoothly deflected and faired downwardly, inwardly, thence upwardly and inwardly without creating significant turbulence therein to reduce aerodynamic drag Therefore, it can be seen that the invention accomplishes at least all of its stated objectives.

Although the invention has been described in language that is specific certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An aerodynamic drag reduction apparatus for a trailer having right and left lower side rails with each of the side rails having a forward end, a rearward end, an upper end, a lower end, an outer side, an inner aide and a longitudinal axis, comprising:
    a first elongated and horizontally disposed air deflector fairing, having a forward end, a rearward end and a longitudinal axis, secured to the right lower side rail adjacent the lower end thereof which extends downwardly, inwardly and thence upwardly and inwardly therefrom; and
    a second elongated and horizontally disposed air deflector fairing, having a forward end, a rearward end and a longitudinal axis, secured to the left lower side rail adjacent the lower end thereof which extends downwardly, inwardly and thence upwardly and inwardly therefrom;
    the longitudinal axis of said first air deflector fairing being parallel to the longitudinal axis of the right lower side rail;
    the longitudinal axis of said second air deflector fairing being parallel to the longitudinal axis of the left lower side rail.

2. The aerodynamic drag reduction apparatus of claim 1 wherein each of said first and second air deflector fairings extend for a portion of the lengths of the right and left lower side rails respectively.

3. The aerodynamic drag reduction apparatus of claim 1 wherein each of said first and second air deflector fairings have outer and inner ends and wherein said outer end of said first air deflector fairing is secured to the inner side of the right lower side rail at said lower end thereof and wherein said outer end of said second air deflector fairing is secured to the inner side of the left lower side rail at the lower end thereof.

4. The aerodynamic drag reduction apparatus of claim 1 wherein each of said first and second air deflector fairings have an outer end portion which extends downwardly from the respective lower side rail and thence inwardly and thence upwardly and inwardly.

5. The aerodynamic drag reduction apparatus of claim 4 wherein each of said first and second air deflector fairings have an inner end portion which extends inwardly from the respective outer end portion thereof.

6. The aerodynamic drag reducer of claim 5 where said inner end portions of said first and second air deflector fairings are secured to the trailer.

7. An aerodynamic drag reduction apparatus for a trailer having right and left lower side rails with each of the side rails haying a forward end, a rearward end, an upper end, a lower end, an outer side, an inner side and a longitudinal axis, comprising:
    a first elongated air deflector fairing, having a forward end, a rearward end and a longitudinal axis, secured to the right lower side rail adjacent the lower end thereof which extends downwardly, inwardly and thence upwardly and inwardly therefrom; and
    a second elongated air deflector fairing, having a forward end, a rearward end and a longitudinal axis, secured to the left lower side rail adjacent the lower end thereof which extends downwardly, inwardly and thence upwardly and inwardly therefrom;
    the longitudinal axis of said first air deflector fairing being parallel to the longitudinal axis of the right lower side ran;
    the longitudinal axis of said second air deflector fairing being parallel to the longitudinal axis of the left lower side rail;
    each of said forward ends of said first and second air deflector fairings having nose portion extending forwardly therefrom.

* * * * *